United States Patent [19]

Balzer

[11] Patent Number: 5,133,897
[45] Date of Patent: Jul. 28, 1992

[54] EMULSIFIERS FOR THE PREPARATION OF AQUEOUS POLYSILOXANE EMULSIONS AND AQUEOUS POLYSILOXANE-PARAFFIN OIL EMULSIONS WITH LONG SHELF LIVES

[75] Inventor: Dieter Balzer, Haltern, Fed. Rep. of Germany

[73] Assignee: Huels Aktiengesellschaft, Marl, Fed. Rep. of Germany

[21] Appl. No.: 559,325

[22] Filed: Jul. 30, 1990

[30] Foreign Application Priority Data

Aug. 4, 1989 [DE] Fed. Rep. of Germany ....... 3925846

[51] Int. Cl.$^5$ .............................................. B01J 13/00
[52] U.S. Cl. ................................... 252/312; 252/321; 252/314; 252/356; 252/DIG. 1; 106/287.14
[58] Field of Search .............. 252/321, 312, 314, 356, 252/DIG. 1; 106/287.14

[56] References Cited

U.S. PATENT DOCUMENTS

| | | | |
|---|---|---|---|
| 4,396,520 | 8/1983 | Payne et al. | 252/550 |
| 4,483,780 | 11/1984 | Llenado | 252/174.17 |
| 4,483,787 | 11/1984 | Jones et al. | 252/551 |
| 4,493,773 | 1/1985 | Cook et al. | 252/174.21 |
| 4,536,318 | 8/1985 | Cook et al. | 252/174.21 |
| 4,565,647 | 1/1986 | Llenado | 252/355 |
| 4,599,188 | 7/1986 | Llenado | 252/174.17 |
| 4,814,376 | 3/1989 | Tanaka et al. | 524/860 |
| 4,987,180 | 1/1991 | Ohata et al. | 524/860 |

*Primary Examiner*—Melvyn I. Marquis
*Assistant Examiner*—Karen A. Hellender
*Attorney, Agent, or Firm*—Oblon, Spivak, McClelland, Maier & Neustadt

[57] ABSTRACT

Stable aqueous emulsions of polysiloxane oil and polysiloxane-paraffin oil are disclosed. The emulsifiers are alkylpolyglycosides of the formula $R-O-Z_n$ wherein R represents a linear or branched, saturated or unsaturated alkyl radical having 8-16 carbon atoms, $Z_n$ represents an alkylolilgoglycoside radical and n is 1-5. The resulting aqueous polysiloxane emulsions and polysiloxane-paraffin oil emulsions have long shelf lives.

4 Claims, No Drawings

EMULSIFIERS FOR THE PREPARATION OF AQUEOUS POLYSILOXANE EMULSIONS AND AQUEOUS POLYSILOXANE-PARAFFIN OIL EMULSIONS WITH LONG SHELF LIVES

BACKGROUND OF THE INVENTION

1. Field of the Invention

The invention relates to emulsifiers for the preparation of polysiloxane oil emulsions and polysiloxane-paraffin oil emulsions.

2. Discussion of the Background

Siloxane oils are used in a great many applications, for example as release agents, slip agents, foam inhibitors, water repellents, carriers for skin restoratives, in plastics processing, in the glass and ceramics industries, in textile production and also in detergent, cosmetic and dermatological formulations. In these applications, the preferred form of the siloxane oils are as water-thinnable oil-in-water emulsions. The preparation of these emulsions is known to be difficult (cf. Ullmanns Enzyklopadie der technischen Chemie, 3rd Ed., Vol. 15, p. 783) and usually requires water-soluble or oil-soluble agents such as alcohols or amines as disclosed in DE-A-1,033,894, and high concentrations of emulsifiers and/or high shear forces, optionally combined with a gel-like final state. A gel provides a certain stability to the emulsion due to high viscosity, as taught in DE-A-3,024,870. Other processes for the preparation of siloxane oil-in-water emulsions are limited to relatively low molecular weight siloxanes (DE-A-3,045,083) or can only be carried out at elevated temperature under vigorous evolution of gas (DE-A-2,730,923). Obviously in the latter case, chemical changes to the polysiloxane accompany the emulsification.

SUMMARY OF THE INVENTION

The present invention provides emulsifiers which allow the preparation of stable polysiloxane emulsions in water using low concentrations of emulsifier, without solution aids, at low shear rates, and without the use of elevated temperatures. This object is achieved by the use of alkylpolyglycosides as emulsifiers for polysiloxane emulsions.

The emulsifiers are characterized in that they contain alkylpolyglycosides of the formula I $$R - O - Z_n \qquad (I)$$

wherein R represents a linear or branched, saturated or unsaturated alkyl radical having 8-6 carbon atoms, Z represents an oligoglycoside radical and n, on average, is 1-5.

Surprisingly, it has been found that these emulsifiers can be used with polysiloxanes of different viscosities, molecular weights and chemical structures. Moreover, these emulsifiers have excellent biodegradability and very low toxicity. Surprisingly, the present emulsifiers can also be used with mixtures of polysiloxane oil and paraffin oil although compounds of the formula I generally do not have a satisfactory emulsifying action with paraffin oil. A more complete appreciation of the invention and many of the attendant advantages thereof will be obtained by reference to the following detailed description.

DETAILED DESCRIPTION OF THE PREFERRED EMBODIMENTS

The invention provides emulsifiers for the preparation of stable aqueous polysiloxane oil emulsions or aqueous polysiloxane-paraffin oil emulsions. The alkylpolyglycosides used according to the invention conform to the general formula (I)

$$R - O - Z_n \qquad (I)$$

wherein R represents a linear or branched, saturated or unsaturated alkyl radical having 8 to 16 carbon atoms, preferably 9 to 14 carbon atoms, and $Z_n$ represents an oligoglycoside radical with, on average, n=1 to 5, preferably 1 to 3 hexose units or pentose units or mixtures thereof.

Particular preference is given to linear saturated alkylpolyglycosides having 10 to 14 carbon atoms and with a degree of glycosidation of between 1.1 and 2.0.

The alkylpolyglycosides used according to the invention can be prepared wholly or partly based on renewable raw materials by known processes. For example, dextrose is reacted in the presence of an acidic catalyst with n-butanol to form butyloligoglycoside mixtures which are then converted to the desired alkyloligoglycosides with long-chain alcohols in the presence of an acidic catalyst. The formula of the products can vary within certain limits. The alkyl radical R is determined by the choice of long-chain alcohol. It is advantageous on economic grounds to use the industrially accessible surfactant alcohols having 8 to 16 carbon atoms, for example natural alcohols from the hydrogenation of fatty acids or fatty acid derivatives, Ziegler alcohols and oxo alcohols.

The oligoglycosyl radical $Z_n$ is determined by the selection of the carbohydrate and by the regulation of the average degree of oligomerisation, n, for example according to DE-A-1,943,689. In principle, it is possible to convert known polysaccharides, oligosaccharides and monosaccharides such as starch, maltodextrin, dextrose, galactose, mannose and xylose into alkylpolyglycosides. Particular preference is given to the industrially accessible carbohydrates starch, maltodextrin and dextrose. Since the industrially relevant alkylpolyglycoside syntheses are not regioselective or stereoselective, the alkylpolyglycosides are always mixtures of oligomers which in turn are mixtures of different isomeric structures. Pyranose and furanose structures are present side by side and have both α- and β-glycosidic linkages. Even the linkage positions differ between pairs of saccharide radicals. Depending on the method of synthesis, the alkylpolyglycosides may also contain associated substances such as residual alcohols, monosaccharides, oligosaccharides and oligoalkylpolyglycosides.

Ecologically the alkylpolyglycosides are among the most gentle surfactants, which is of particular interest for cosmetic and pharmaceutical applications of polysiloxane oils and polysiloxane-paraffin oil mixtures. For instance, tests of biodegradability in the coupled unit test gave DOC-degradation values of 95 to 97%.

Toxicity data shows an LD 50 (rat)>10,000 mg/kg, LC 50 (Golden orfe) of 12-40 mg/l and EC 50 (daphnia) of 30-110 mg/l for both $C_{10}$-$C_{12}$- and $C_{12}$-$C_{14}$-alkylpolyglycosides. This data, indicates excellent ecological safety compared with many other surfactants.

Throughout this disclosure "gentle" shear forces refers to the typical sheer forces generated in the normal chemical laboratory using a magnetic stir bar or manual agitation. The preferred method for preparing the emulsion comprises dissolving or dispersing the emulsifier at room temperature in the polysiloxane oil or polysiloxane-paraffin oil mixture by applying gentle shear forces. Usually these fluids have a slight opacity which remains constant for days. Then, again using only gentle shear forces, water is admixed with the solution or dispersion with stirring. The emulsions obtained by this method are generally white to bluish-white and stable for months. In a few cases creaming is observed and can be eliminated by gentle shearing.

The emulsifier concentration relative to the oil phase is usually between 2 and 40%, preferably between 5 and 30%, the determining factor being economy. The water/oil ratio is usually between 100 and 0.2, preferably between 50 and 0.3, and the viscosity of the emulsion increases with an increasing proportion of the dispersed phase.

If desired it is possible to add other surfactants as coemulsifiers to the alkylpolyglycoside. Suitable surfactants include: anionic types such as long chain fatty carboxylic acids and sulfates; the cationic types such as alkyl ammonium salts; the zwitterionic types such as alkyl ammonium carboxylates and alkyl amine oxides; and the nonionic surfactants such as alkyl esters and ethers. However, the additional surfactants, if any, are not used in an amount greater than 50% by weight, relative to the alkylpolyglycosidic surfactants.

Having generally described this invention a further understanding can be obtained by reference to some specific examples which are provided herein for purposes of illustration only and are not intended to be limiting unless otherwise specified.

EXAMPLES

EXAMPLE 1

5 g of a $C_{10}$-$C_{12}$-alkylpolyglycoside (proportion of active substance 46%, $C_{10}/C_{12}$ 4:1, average D.P. 1.3 determined by $^1$H-NMR) were dispersed at room temperature in 10 g of polydimethylsiloxane oil of viscosity 500 c St, with gentle stirring, in the course of about 20 sec. Then 85 ml of deionized water was admixed over 1 to 2 minutes by stirring with the slightly viscous dispersion. A bluish-white emulsion formed, which showed no sign of instability even after standing for 2 to 3 months.

EXAMPLE 2

5 g of a $C_{12}$-$C_{13}$-alkylpolyglycoside (proportion of active substance 55%, $C_{12}/C_{13}$ 41:58, average D.P. 1.2) were dispersed at room temperature in 10 g of a 1:1 mixture of polydimethylsiloxane oil of viscosity 500 c St and a DAB 6 Paraffin oil of viscosity 140 c St, i.e., conforming to Federal German Pharmacopoeia, 6th Ed. Then 85 ml of deionized water was admixed with stirring as in Example 1. A white emulsion formed which was stable for months. This result is surprising since a similar experiment with pure paraffin oil resulted in separation of the emulsion, with creaming, after only minutes and complete separation after about 1 hour.

EXAMPLES 3 TO 13

Examples 3 to 13 were carried out in an identical manner as Example 1. They illustrate the effective emulsification of polysiloxane oil to form oil-water emulsions using the alkylpolyglycosides of the present invention with variation of the polysiloxane oil, the emulsifier structure, the concentration, and the water-oil ratio. The results are shown in Table 1.

EXAMPLE 14

1.2 g of alkylpolyglycoside $C_{10}$, $C_{13}$, $G_{1.6}$ and 1.15 g of MARLIPAL® 24/50 (a $C_{12}$-$C_{14}$-fatty alcoholethoxylate with 5 mol of ethylene oxide/mol) were dispersed in 10 g of a 1.1 mixture of dimethylpolysiloxane oil of viscosity 500 c St and a DAB 6 Paraffin oil of viscosity 140 c St, i.e., conforming to Federal German Pharmacopoeia, 6th Ed. Then, as in Example 1, water was admixed with stirring. A white emulsion formed which had a high stability. In contrast, the ethoxylate alone has no emulsifying effect on the present oil-in-water system.

Obviously, numerous modifications and variations of the present invention are possible in light of the above teachings. It is therefore to be understood that within the scope of the appended claims, the invention may be practiced otherwise than as specifically described herein.

TABLE 1

| Composition | Example | | | | | | | | | | |
|---|---|---|---|---|---|---|---|---|---|---|---|
| | 3 | 4 | 5 | 6 | 7 | 8 | 9 | 10 | 11 | 12 | 13 |
| Dimethylpolysiloxane oils | | | | | | | | | | | |
| Visc. 100 c St | 10 | | | | | | | | | | |
| 250 | | 10 | | | | | | | | | |
| 500 | | | | | | 5 | 5 | 5 | 35 | 3.3 | 60 |
| 2000 | | | 10 | | | | | | | | |
| Dimethylpolysiloxane oil Visc. 200 c St | | | | 10 | 5 | | | | | | |
| Parafin oil DAB 6, Visc. 140 c St | | | | | 5 | 5 | 5 | 5 | | 6.7 | |
| Water | 88 | 88 | 88 | 88 | 88 | 88 | 87 | 89 | 60 | 88 | 28 |
| $C_{10}C_{12}$ APG ($G_{1.3}$) | 2.3 | 2.3 | 2.3 | 2.3 | | | | 1 | 4.6 | 2.3 | 12 |
| $C_{12}C_{13}$ APG ($G_{1.2}$) | | | | | 2.3 | | | | | | |
| $C_{12}C_{13}$ APG ($G_{1.2}$) | | | | | | | 2.5 | | | | |
| $C_{12}C_{14}$ APG ($G_{1.2}$) | | | | | | 2.4 | | | | | |
| Emulsion stability* after 3 days | ++ | ++ | ++ | ++ | ++ | + | ++ | ++ | ++ | ++ | ++ |

* ++ Very stable, + stable, slight but readily re-dispersible creaming

WHAT IS CLAIMED IS:

1. An oil-water emulsion subjected to gentle shear forces comprising: water;

one or more polysiloxane oils or a mixture of one or more polysiloxane oils and paraffin oils; and an alkylpolyglycoside of the formula I $$R - O - Z_n \qquad (I)$$

wherein R represents a linear or branched, saturated or unsaturated alkyl radical having 8-6 carbon atoms, $Z_n$ represents an oligoglycoside radical, and n is 1-5.

2. The emulsion of claim 1, wherein R is a linear, saturated alkyl radical having 10-14 carbon atoms, $Z_n$ is an oligoglycoside radical, and n is 1.1 to 2.0.

3. The emulsion of claim 1, further comprising a co-emulsifier selected from the group consisting of anionic, cationic, zwitterionic and non-ionic surfactants.

4. A method for preparing an oil-water emulsion of claim 1 comprising:
dispersing an effective amount of an alkylpolyglycoside of the formula I in polysiloxane oil or a mixture of polysiloxane-paraffin oil; and
admixing water using gentle shear forces.